United States Statutory Invention Registration [19]

[11] Reg. Number: H544

Castillo et al.

[43] Published: Nov. 1, 1988

[54] IMPRESSED CURRENT CATHODIC PROTECTION SYSTEM EMPLOYING COBALT SPINEL STRUCTURED ANODE

[75] Inventors: Raul A. Castillo, Brazoria; Donald L. Caldwell; Ralph W. Parham, Jr., both of Lake Jackson, all of Tex.

[73] Assignee: The Dow Chemical Company, Midland, Mich.

[21] Appl. No.: 37,762

[22] Filed: Apr. 13, 1987

Related U.S. Application Data

[63] Continuation of Ser. No. 571,293, Jan. 16, 1984, abandoned, which is a continuation of Ser. No. 380,481, May 21, 1982.

[51] Int. Cl.[4] ..... C23F 13/00

[52] U.S. Cl. ..... 204/147; 204/196; 204/290 F

[58] Field of Search ..... 204/147, 148, 196, 197, 204/290 F

[56] References Cited

U.S. PATENT DOCUMENTS

| | | | |
|---|---|---|---|
| 2,273,897 | 2/1942 | Scott | 204/196 |
| 3,354,063 | 11/1967 | Shutt | 204/196 |
| 3,414,496 | 12/1968 | Sudbury et al. | 204/147 |
| 3,711,397 | 1/1973 | Martinsons | 204/290 F |
| 4,056,446 | 11/1977 | Vennett | 204/196 |
| 4,116,782 | 9/1978 | Bon | 204/196 |
| 4,369,105 | 1/1983 | Caldwell et al. | 204/290 F |

*Primary Examiner*—Herbert B. Guynn
*Assistant Examiner*—Eric Jorgensen
*Attorney, Agent, or Firm*—Walter J. Lee

[57] ABSTRACT

Impressed current cathodic protection systems employing an anode having a cobalt spinel type surface, said surface having the formula: $M_xZ_yCo_{(3-(x+y))}O_4$, where M is a metal or a mixture of two or more metals selected from the group of metals contained in Groups IB, IIA, and IIB of the periodic table of the elements, where Z is a metal or a mixture of two or more metals selected from the group of metals contained in Group IA of the periodic table of the elements, where $0 \leqq x \leqq 1$, where $0 \leqq y \leqq 0.5$, and where $0 \leqq (x+2y) \leqq 1$.

4 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

IMPRESSED CURRENT CATHODIC PROTECTION SYSTEM EMPLOYING COBALT SPINEL STRUCTURED ANODE

This is a continuation of application Ser. No. 571,293 filed Jan. 16, 1984 which is, itself, a continuation of application Ser. No. 380,481, filed May 21, 1982 now abandoned.

BACKGROUND OF THE INVENTION

This invention relates to the control of metallic corrosion by the well known power-impressed current cathodic protection method. More particularly it relates to the anodes used in this method or system of metal protection.

Cathodic protection of metal structures is an old art. In 1824 A.D. Sir Humphrey Davy described how zinc anodes could be used to prevent the corrosion of copper sheathing on the wooden hulls of British naval ships. The method ultimately failed and interest waned for almost 100 years before it was first used successfully to protect underground pipes. (See *Corrosion*, vol. 2, p. 11:1, edited by L. L. Shreir, published by Newnnes-Butterworth of London and Boston in 1976.)

Cathodic protection of metal structures from corrosion is applied by one of two methods, that is by the electrical power impressed current method or by the sacrificial anode method. In either method a second metal which serves as an anode is maintained in contact with the same environment as that contacting the metal structure to be protected from corrosion and both the metal to be protected and the anode must be electrically connected. Since the environment must conduct ions for corrosion to take place, it can range from highly conductive substances, such as sea water, to less conductive environments such as earth and concrete.

Corrosion of the metal in such environments is a well-known phenomenon of nature which occurs as the metal gives up electrons to its surrounding environment by electrochemical reactions with the environment. The concept of preventing this corrosion is to force electrons into the metal from an external power source at a rate which is at least just as great as the rate of electrons leaving the metal to become involved in the corrosion causing electrochemical reaction occurring between the metal and its environment.

Briefly, in the impressed-current system of cathodic protection, an electromotive force (EMF) is relied upon to supply electrons to the environment and thus eliminate the metal to be protected as a source of the electrons required to balance the natural requirement for electrons to the environment due to the presence of the metal therein. Both the anode and cathode are in electric contact with each other and each is in electrical contact with the environment, the corroding medium.

Since a source of electrons is supplied by the power source and the source is sufficiently large to supply the needs to prevent electron flow from the metal to be protected, it makes no difference whether the anode is naturally more electropositive than the metal to be protected. However, as with sacrificial anodes, even the anodes of an impressed-current cathodic protection system will corrode away rapidly unless special anode material is selected. Since in many applications where cathodic protection is employed, it is difficult and expensive to replace the cathodic protection anodes frequently, it is desirable they be prepared from a material which has resistance to the corrosive environment. The commonly used cathodic protection anode materials and their consumption rates are shown in Table I set forth immediately below.

TABLE I

| Anode Material* | Appropriate Consumption Rate (kilogram/amp-year) |
|---|---|
| coke breeze | 0.5 |
| zinc | 10.8 |
| aluminum | 4.5 |
| graphite | 0.1–1.0 |
| Lead/platinum | 0.09 |
| Pb—6Sb—1Ag | 0.09 |
| Cast Iron | 4.5–6.8 |
| Iron | 9.5 |
| Steel | 6.8–9.1 |
| High-silicon iron | 0.25–1.0 |
| High-silicon/chromium iron | 0.25–1.0 |
| DSA-Titanium** | $4.75 \times 10^{-6}$ |
| Platinum | $8.63 \times 10^{-6}$ |
| Platinized titanium | $8.76 \times 10^{-6}$ |
| Platinized niobium | Ditto approx. |
| Platinized tantalum | Ditto approx. |

*The above information was gathered from pages 11:34–11:56 of vol. 2 of Corrosion cited above.

**DSA is the shortened form of the proprietary name, Dimensionally Stable Anode. It is owned by the Diamond Shamrock Technologies Company. The material for this anode was originally developed by Henri Beer, of Antwerp, Belgium. See U.S. Pat. No. 3,632,498. The anodes claimed therein include coatings comprised of a mixture of an oxide of a film forming metal and an oxide of a platinum group metal on a base chosen from a select group of metal bases. In the trade the DSA anode has come to be associated with the specific anode having a titanium substrate with a coating of the oxides of ruthenium and titanium, with the weight proportion of these oxides being about equal.

As can be seen from the table above there is about a million-fold decrease in anode consumption rate (conversely a similar increase in expected life of the anode under the conditions) when moving from the cheaper metals to the expensive platinum and platinum group metal coated anodes, the DSA anode being an anode containing ruthenium in its surface coat. However, these anodes are tremendously greater in cost per unit weight than the cost of the other types of anodes.

Besides the consumption rate and cost involved in the selection of these anodes, there are other criteria to be considered. For example, power efficiency is a criterion to be considered; that is, how many amperes of current per volt per unit of surface area an anode will provide. At the same voltage, it is known that different anode materials produce different electrical current densities. It is therefore desirable that greater power efficiency be achieved, that is, a high ratio of amperes per unit area per volt applied.

An additional problem associated with the platinum and with the platinum coated anodes is that the platinum will complex with some organic compounds and be very rapidly consumed. See page 6:11 of *Corrosion* cited above. Of course, this complexing destroys the long-term capability of the anode to control the corrosion of the metal structures it is intended to protect. Thus very expensive organic chemical processing equipment can rapidly corrode in industry with great loss of capital and sales.

Thus it would be advantageous to have anodes for use in impressed cathodic protection systems which have a low consumption rate, which are economical, which have a high power efficiency, and which are not known to complex with organic compounds. The present invention provides such anodes.

SUMMARY OF THE INVENTION

The present invention is an improved anode for impressed-current cathodic protection applications. It comprises an electroconductive substrate coated with an electroconductive metal oxide external coating. This metal oxide external coating has a spinel structure and has the formula:

$$M_xZ_yCo_{(3-(x+y))}O_4,$$

where M is a metal or a mixture of two or more metals selected from the group of metals contained in Groups IB, IIA, and IIB of the periodic table of the elements, where Z is a metal or a mixture of two or more metals selected from the group of metals contained in Group IA of the periodic table of the elements, where $0 \leqq x \leqq 1$, where $0 \leqq y \leqq 0.5$, and where $0 \leqq (x+2y) \leqq 1$. It is to be understood that x and y are not restricted to being integers in the above formula. The spinel coating optionally contains a modifier metal oxide. For purposes of this invention: Group IA is taken to mean lithium, sodium, potassium, and rubidium; Group IIA is taken to mean beryllium, magnesium, calcium, strontium, barium, and radium; Group IB is taken to mean copper, silver, and gold; and Group IIB is taken to mean zinc, cadmium, and mercury.

Preferably the anode substrate is a metal selected from the group consisting essentially of titanium, tantulum, tungsten, zirconium, molybdenum, niobium, hafnium, vanadium and mixtures thereof. Titanium is preferred as the substrate for most applications, but in those instances where the electrical resistance of the soil or electrolyte is very high, or varies greatly with time, then the more expensive niobium may be preferred for the substrate. Higher resistance usually requires higher voltages impressed on the anodes, and titanium has a lower breakdown voltage than niobium.

In many instances a superior impressed-current cathodic protection anode is obtained if the anode of the present invention is comprised of an interfacial coating bonded between the substrate and the external coating.

Additionally this invention encompasses impressed-current cathodic protection systems which provide means for protecting the anode from electrical current and voltage overloads, surges, and reversals when used in combination with the above defined anode.

BRIEF DESCRIPTION OF THE DRAWINGS

A better understanding of the invention will be had by reference to the drawings wherein like parts have the same reference numerals in the different figures, and wherein.

DETAILED DISCUSSION OF THE INVENTION

Figure 1:
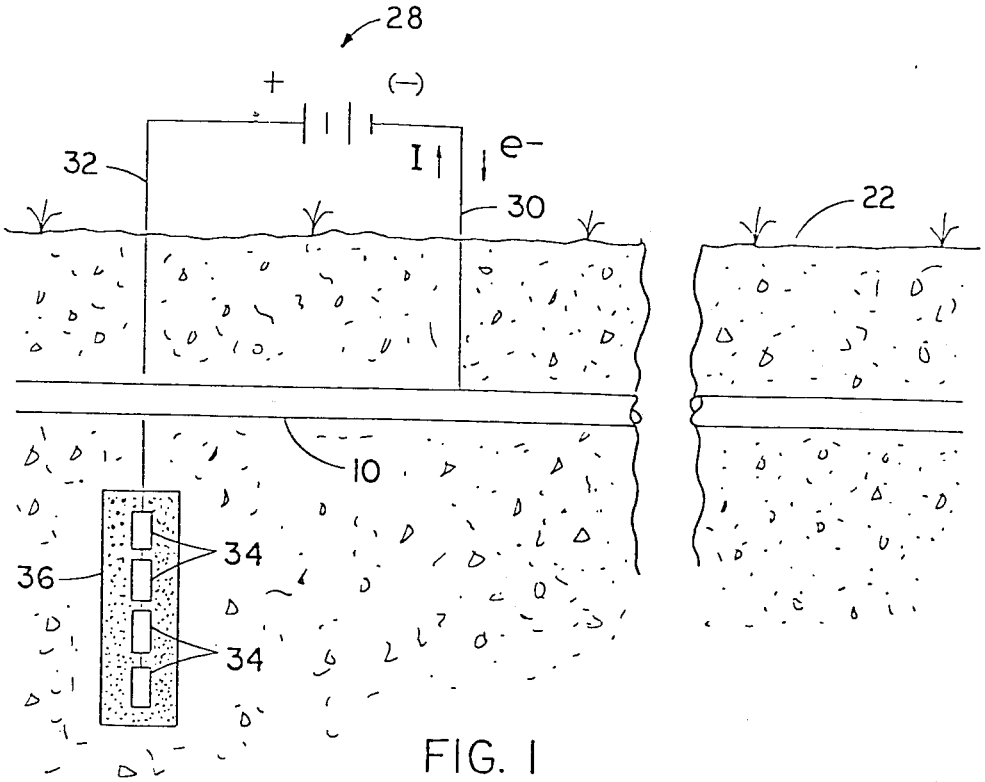
FIG. 1 is a side elevation of a schematic application of a simplified impressed-current cathodic protection system applied to an underground pipeline.
Figure 2:
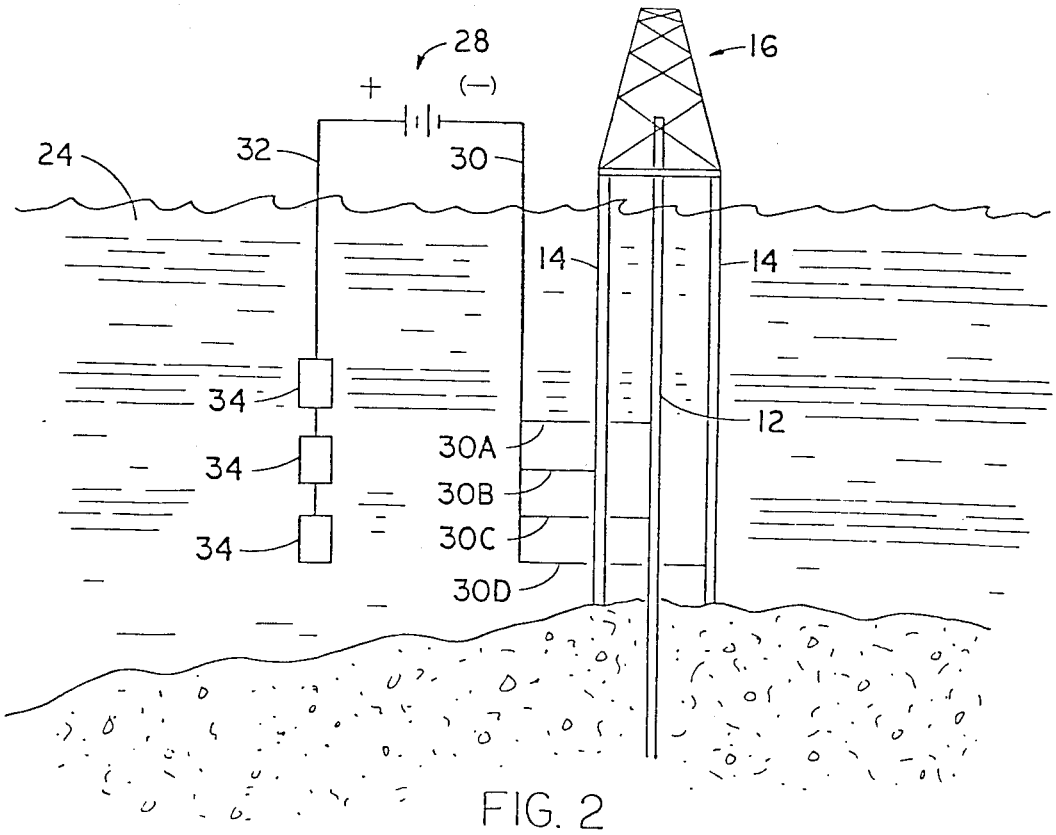
FIG. 2 is a side elevation of a schematic application of a simplified impressed-current cathodic protection system applied to some underwater parts of an off-shore drilling rig.
Figure 3:
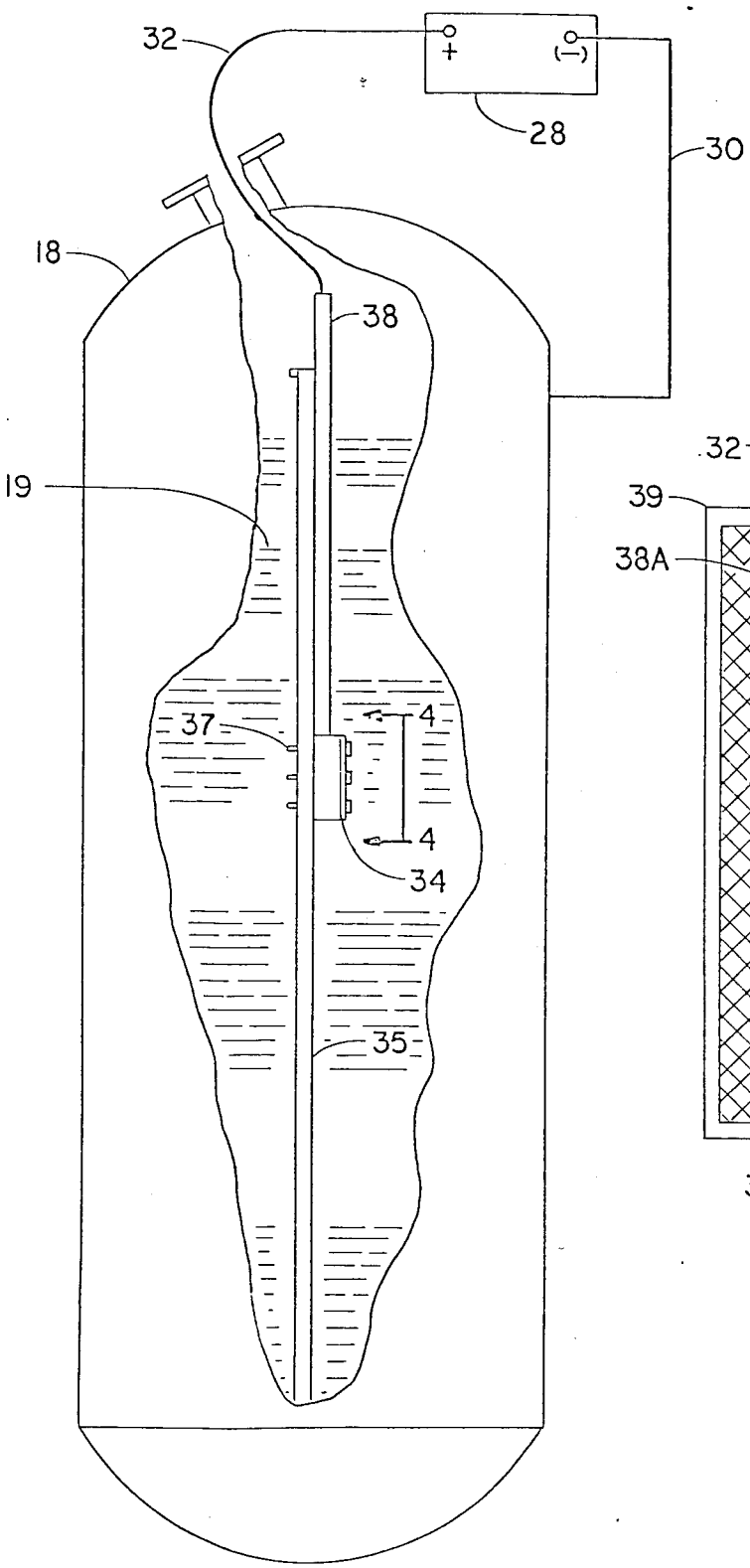
FIG. 3 is a partially broken away, schematic front elevation of a simplified chemical reactor showing the installation of an impressed-current cathodic protection system.

Referring to FIGS. 1, 2, 3, 4, there can be seen schematic representations of representative examples of the many applications for protection of metal and metal structures by impressed-current cathodic protection methods and apparatus. Protection of an underground metal pipeline 10 is illustrated in FIG. 1; protection of the well casing 12 and platform support legs 14 of an off-shore drilling rig 16 is illustrated in FIG. 2; and protection for the metal of an organic chemical reactor 18 is illustrated in FIG. 3.

In each application the metal structure to be protected is submerged in, or is in contact with, an environment that contains sufficient electrolyte to allow migration of ions to and from the metal to be protected. The dirt 22 of FIG. 1 contains sufficient moisture with dissolved ions to allow such ion migration. Similarly with the sea water 24 of FIG. 2 and the organic liquid 19 contained in reactor 18 of FIG. 3.

Referring to FIG. 1, a D.C. electrical power source 28 can be seen. Electrically connected to the negative terminal of power source 28 is an insulated copper wire 30 which is also electrically connected to steel pipeline 10. A second insulated copper wire 32 electrically connects the positive terminal of power source 28 to the metal protecting anodes 34. Usually a plurality of anodes are electrically connected in a series strung out in a vertical hole in the dirt 22, and then surrounded in the hole with an electrically conductive backfill 36 such as a small particle size carbonaceous material; e.g., graphite and coke breeze. Use of this backfill is done to increase the surface area of the highly conductive anode contacting the relatively much less conductive dirt 22. In this manner there can be much more electric current passage through and electron transfer between the ions in the dirt 22 without the larger voltage drive on the anodes 34 which would ordinarily be required absent the backfill 36. Thus backfill 36 in effect causes there to be a smaller electrical resistance in the dirt 22 between anodes 34 and pipe 10 of FIG. 1.

Changing from the dirt environment 22 of FIG. 1 and turning to the sea water environment 24 of FIG. 2, it can be observed that the same basic arrangement of the impressed cathodic protection system is employed. That is insulated wires 30, **30*a*, 30*b*, 30*c*, 30*d* electrically connect the metal structures to be protected, well casing 12 and platform support legs 14, to the negative terminal of the D.C. electrical source 28 while insulated wire 32 electrically connects anodes 34 to the positive terminal of power source 28**.

Referring to FIG. 3, the same principle of operation of the impressed-current cathodic protection method is seen applied to a chemical process reactor 18 wherethrough an organic chemical process stream 19 containing water and corrosive ions is passing. In FIG. 3 there is shown an impressed current cathodic protection anode 34 attached by bolts 37 to a baffle 35 fixed in reactor 18 within the corrosive organic liquid 19. Anode 34 is electrically connected by anode lead wire 32 to the positive terminal of D.C. electrical power source 28. Reactor 18 is electrically connected to the negative terminal of D.C. electrical power source 28 via wire 30. Within reactor 18, wherein anode lead wire 32 would be exposed to the corrosive organic liquid 19, wire 32 is encapsulated within an acrylic conduit 38 (as in FIG. 4) by a non-corrosive epoxy resin 38*a*.

Figure 4:
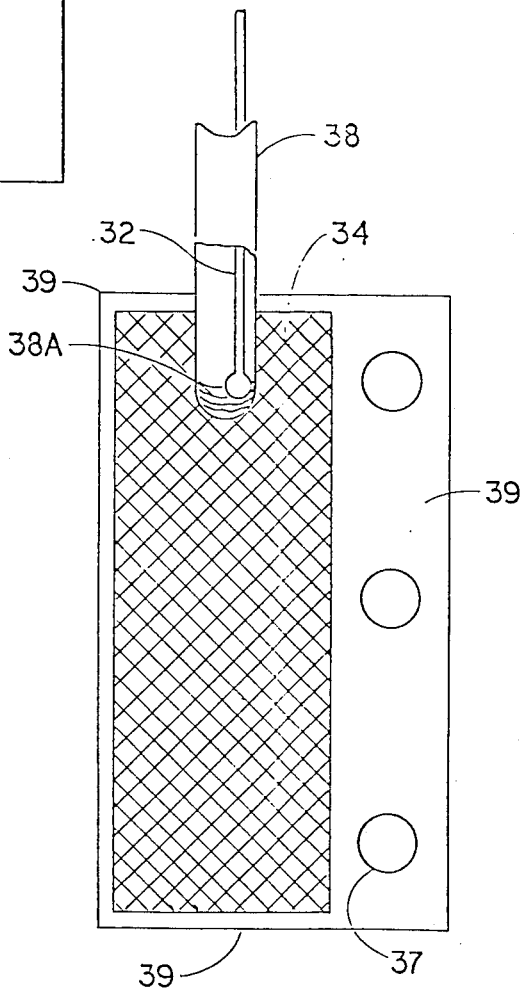
FIG. 4 is an enlarged side elevation of the anode of FIG. 3, taken along line 4—4 of FIG. 3.

Epoxy resin 38*a* is also used to cover the electrical connection made between wire 32 and anode mesh 34 as can be seen in FIG. 4. Also in FIG. 4 is shown a non-corrosive frame 39 fitting around the edges of anode mesh 34 to form a support by which anode mesh 34 can be conveniently bolted to baffle 35 in the manner shown in FIG. 3.

Figure 5:
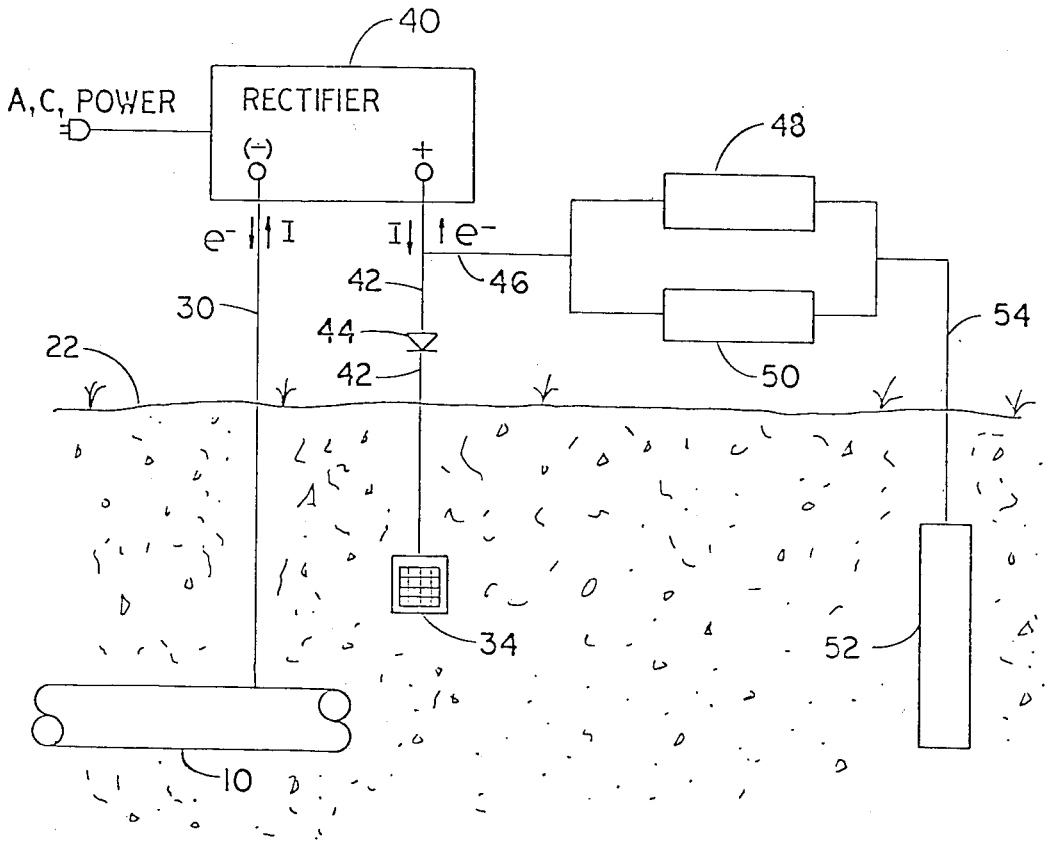
FIG. 5 is a schematic view of an impressed-current cathodic protection system with anode voltage and current protection means, said system being shown as applied to a buried pipeline shown in side elevation.

Referring to FIG. 5, a means can be seen for protecting impressed-current cathodic protection anode 34, buried in dirt 22 and protecting buried pipeline 10, from electric current flowing in the wrong direction into said anode 34 from rectifier and protecting it from surges of overload currents and voltages flowing in the right direction, i.e. positive current flowing from the positive terminal of rectifier 40 down wire 42 through diode 44 to anode 34.

Diode 44 prevents current from travelling in the wrong direction along wire 42. To prevent overly powerful voltage and current surges travelling down wire 42 to anode 34, a lightning arrester system is connected to line 42 above diode 44 via line 46. This system is comprised of fast, but small current capacity, breakdown switch 48 and of slow, but large current capacity, breakdown switch 50 connected in parallel to line 46 and to zinc electrode 52 via line 54. Zinc electrode 52 can be seen to be buried in dirt 22. Fast breakdown switch 48 is metal oxide varister which is known to be capable of acting like a very swiftly closing switch when excess voltage appears on line 42. In so doing this varister 48 quickly shunts extra current coming from the higher voltage away from diode 44 and anode 34. However, these varisters 48 are not capable of shunting a large current without burning out. Hence, a shunting switch 50 which can handle large currents, albeit at a slower reaction time, is placed in parallel with varister 48. This slower responding device is slow breakdown switch 50. Hence if a large current and voltage surge appears in line 42 above diode 44, then fast breakdown switch 48 will shunt the initial part of the overload away from anode 34 to zinc ground rod 52, while slow breakdown switch 50 reacts in time to shunt the major part of the voltage and current overload. A suitable slow breakdown switch 50 has been found to be model AS1B1 manufactured by McGraw Edison Company. A suitable fast breakdown switch 48 has been found to be Model V130LA20A, manufactured by General Electric Company.

The invention may be better understood by further discussing it in the following order: (1) Example of the Invention, (2) Comparative Experiment of the Invention, and (3) Discussion of the Invention Anode.

1. Example of the Invention

Three pieces of ASTM grade I titanium mesh, each approximately 3"×20"×0.063" (7.62×50.80×0.16 cm), are dipped in 1,1,1-trichloroethane, air dried, dipped in HF-$HNO_3$ etching solution approximately 30 seconds, rinsed with deionized water, and air dried. The mesh is blasted with $Al_2O_3$ grit to a uniform rough surface and blown clean with air. An interface coating precursor solution is prepared as follows: 52.0 g of $InCl_3.4H_2O$ and 0.36 g $SbCl_3$ are dissolved in 128.0 g concentrated reagent HCl and 820.0 g technical isopropyl alcohol. An active spinel coating precursor is prepared by mixing appropriate quantities of $Co(NO_3)_2.6H_2O$, $Zn(NO_3)_2.6H_2O$, aqueous $ZrO(NO_3)_2$ solution, and deionized $H_2O$ to give a mole ratio of 10 Co:5 Zn:1 Zr.

The specimens are dipped in the interface solution, baked in a 400° C. convection oven for about ten minutes, removed, and cooled in air about ten minutes. The specimens are then given twelve coats of spinel. Each coat is applied by dipping in spinel coating precursor, baking at 400° C. ten minutes, removing from the oven, and cooling in air about ten minutes. After the twelfth spinel coat has been baked the anodes are given a final bake at 375° C. for about one hour.

The electrodes so made are suitable for a wide range of applications in the general field of impressed current cathodic protection. They are especially suitable for the protection of process vessels, because their very low wear rate in service results in minimal contamination of the process fluids with anode reaction products. The anodes can be used at a high current density (approximately 322 $A/M^2$ or 30 amps/ft.$^2$) with a low anode consumption rate ($<50\times10^6$ Kg/Amp.yr. or $<110\times10^{-6}$ lb/Amp.yr.). The cathode current density needed to reach the desired potential is determined by laboratory tests.

Reference to FIGS. 3 and 4 will be helpful in understanding the following discussion. Three anodes prepared as described above are used to protect an austinitic stainless steel process vessel 18 from pitting or stress corrosion cracking in a high chloride organic process. Stress cracking of stainless steel is a type of corrosion known to be difficult to prevent, and thus this application is a severe test of a cathodic protection system. Referring to FIG. 3, the anodes 34 are supported by a fiberglass frame 39 bolted to the reactor baffles 35. The anode lead wires 32 are #8 Hylar® cable run through fiberglass conduit 38 from the anodes 34 to the top of the reactor. The anode-lead wire connections 32 are encapsulated with DERAKANE® vinyl ester resin 38*a* as shown in FIG. 4. The fiberglass conduit 38 ends at the top of the reactor 18 are likewise sealed with DERAKANE® vinyl ester resin-epoxy composite to prevent process entry to the conduit 38.

The electrical circuit comprises a D-C rectifier 28 with negative lead 30 attached to the vessel 18 and positive lead 32 attached to the anode assembly 34. The rectifier 28 is a 16 vol-75 amp automatic/manual potential controlled system. A visual alarm on the rectifier cover utilizing a current relay lets the plant operators know that the rectifier is energized and that current is flowing through the process side of the cathodic protection circuit. Transducers are used to provide input to the control room where panel mounted instruments display cathodic protection current and the structure-to-electrolyte (corrosion) potential.

The product containing 5 percent chlorides is a specialty product intermittently made in an existing reactor used for non-chloride organic products. Each batch takes 24 hours to run with the 5 percent chloride final stage remaining in the reactor for up to 12 hours.

During a batch run, the following procedure is typically used to minimize corrosion of the reactor: The plant operator opens the aqueous chloride feed line valve, energizes the rectifier, and then energizes the feed line pump in that order. The rectifier is adjusted to maximum output until the structure-to-electrolyte potential value reaches −0.750 V (Ag-AgCl) and then turned down as the corrosion potential exceeds −0.800 V (Ag-AgCl). The cathodic protection current needed to maintain the corrosion potential $-0.800\pm0.05$ V (Ag-AgCl) is $34\pm1$ amp. The cathodic protection current and structure to electrolyte potential are periodically monitored in the control room to insure the structure-to-electrolyte potential is in the desired range. The rectifier current output is lowered as the reactor is emptied until the reactor is approximately 25 percent full. At that point the rectifier is turned off.

After a number of runs the reactor is inspected and found to be free of stress corrosion cracking, the only corrosion evident being a few shallow pits randomly scattered around the reactor. The cathodic protection system is thus demonstrated to be very suitable for this application.

2. Comparative Experiment of the Invention

Tests were conducted to measure the amount of current per square inch of surface area produced by a platinum, DSA-type, and cobalt-spinel electrode, subjected to an external power source.

Figure 6:
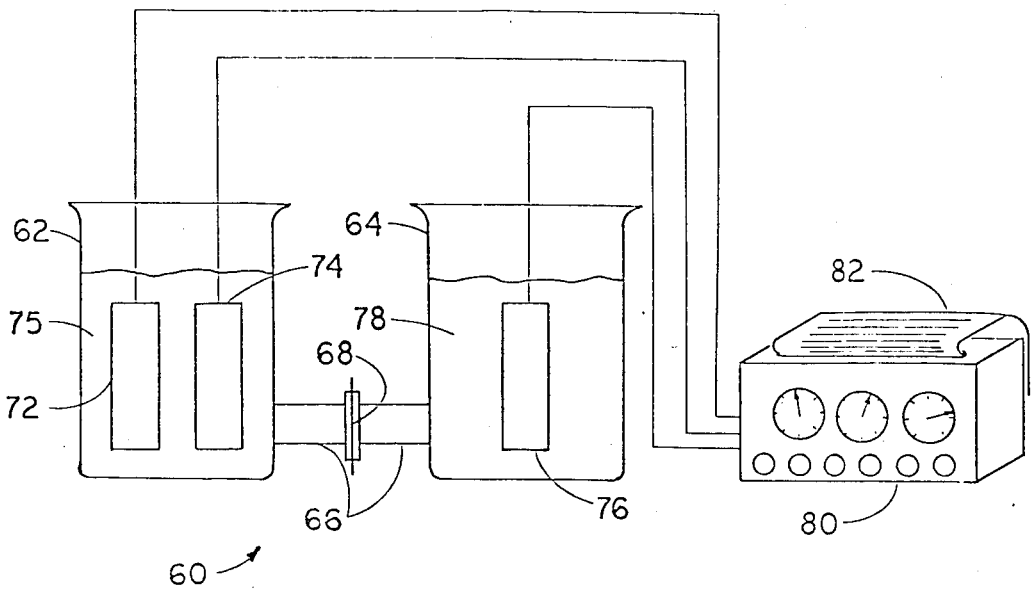
FIG. 6 is a schematic side view of the test cell used in the comparative experiment set forth below.

The test cell 60 (see FIG. 6) consisted of two standard 1000 ml resin kettles 62, 64 with standard covers. The resin kettles were modified in that each of them had a neck 66 fitted at midpoint on their sides so as to permit the joining of the two resin kettles as depicted in FIG. 6.

An ion exchange membrane 68 was positioned at the junction so as to permit ion flow while denying electrolyte passage.

The test electrode 72 along with a standard calomel electrode 74 was placed in one resin kettle 62 which contained an aqueous solution of NaCl 75 having a pH of 1.5. An auxiliary electrode 76 was placed in the second resin kettle 64 which contained 10% caustic (pH $\geqq$14) 78. Both electrolytes were maintained at a constant temperature of 70° C.

A Potentiodyne Analyzer, Model M4100, from Petrolite Corporation, was used to determine first the Open Circuit Potential (ECORR); i.e., the potential at which the electrode is in equilibrium with the environment (freely corroding). The Potentiodyne Analyzer was then used to provide a uniform increase of power to provide the current required to produce the pre-set constant change of anode potential. The amount of current required was based upon the conductivity of the electrolyte and the characteristics of the electrode surface area.

The Potentiodyne Analyzer changed the potential of the test electrodes with respect to the saturated calomel electrode from the open circuit potential to +1400 mv at the rate of 3 volts/hour, then to −1400 mv and back to +1400 mv at the same rate. The Potentiodyne uses semi-log chart paper 82 to plot the change in volts vs. the current density (log I/cm$^2$) produced.

The change in volts from the electrode's Open Circuit Potential (freely corroding potential) to that potential at which maximum current density is produced, subject to equipment limitations, is a measure of the electrode's efficiency. The electrode whose surface characteristics are such that it produces more current per unit area than other electrodes in the same environment and for the same or less amount of volts has a distinct advantage over the others.

As can be seen from Table II below, the voltage required to produce the same electrical current densities for the three electrodes tested was least for the anode of this invention, the cobalt spinel type anode, than it was for the more expensive anodes. Thus the cobalt spinel anode was surprisingly more electrically efficient than the more expensive platinum and DSA-type anodes.

TABLE II

| Anode Type | Voltage Required to Produce 0.01 amp per square centimeter (millivolts) | Voltage Required to Produce 0.1 amp per square centimeter (millivolts) |
|---|---|---|
| Pure platinum | 200 | 312 |
| DSA-type* | 110 | 515 |
| Cobalt-spinel type** | 76 | 304 |

*The DSA-type anode was a ruthenium-titanium-tin oxide anode generally prepared as described below.

**The cobalt-spinel anode was prepared generally following the procedure set forth below.

The general procedure used for making anodes of the DSA-type anode used in the comparative experiment is as follows. Cylindrical titanium rods, approximately 1" long$\times\frac{1}{4}$ diameter (2.54$\times$0.64 cm) are dipped in 1,1,1-trichloroethane, air dried, rinsed in deionized $H_2O$, placed in 1:1 HCl solution for 15 minutes, rinsed in deionized $H_2O$, and air dried. A coating precursor solution is prepared as follows: 65.28 g of $RuCl_3.2.5H_2O$ and 31.46 g of $SnCl_2$ are dissolved in 49.5 g of concentrated reagent HCl; to this solution is added 305.6 g tetra-isobutyl titanate and 497.6 g technical isobutyl alcohol. Then, the rods are dipped in the coating solution, baked in a 500° C. convection oven for ten minutes, removed, and cooled in air about ten minutes. Five additional coats are added similarly. After the sixth coat the 500° C. bake is extended for a total of sixty minutes.

The general procedure for making the cobalt oxide anode used in the comparative experiment above is as follows. Cylindrical titanium rods, approximately 1" long$\times\frac{1}{4}$ diameter (2.54$\times$0.64 cm) are dipped in 1,1,1-trichloroethane, air dried, rinsed in deionized $H_2O$, placed in 1:1 HCl solution for 15 minutes, rinsed in deionized $H_2O$, and air dried. An interface coating precursor solution is prepared as follows: 2.96 g of $In(NO_3)_3$ is dissolved in 6.10 g 70% reagent $HNO_3$ and 50.0 g technical isopropyl alcohol; a cobalt spinel coating precursor is prepared by mixing appropriate quantities of $Co(NO_3)_2.6H_2O$, $Zn(NO_3)_2.6H_2O$, aqueous $ZrO(NO_3)_2$ solution, and deionized $H_2O$ to give a mole ratio of 10 Co:5Zn:1Zr. Then, the rods are dipped in the interface solution, baked in a 375° C. convection oven for about ten minutes, removed, and cooled in air about ten minutes. The rods are then given six coats of cobalt spinel. Each coat is applied by dipping in spinel coating precursor, baking at 375° C. ten minutes, removing from the oven, and cooling in air about ten minutes. After the sixth spinel coat has been applied the rods are given a final bake at 375° C. for about one hour.

3. Discussion of the Invention Anode

The insoluble anode of this invention comprises an electroconductive substrate with an effective amount of a polymetal oxide coating having a spinel structure conforming substantially to the empirical formula $M_xZ_yCo_{3-(x+y)}O_4$, where $0\leqq x\leqq1$, $0\leqq y\leqq0.5$, $0\leqq(x+2y)\leqq1$, and where M is a one metal of Groups IB, IIA, and IIB and Z is at least one metal of Group IA. The spinel coating optionally contains a modifier metal oxide.

The anode is also one in which the electroconductive substrate can be coated with a first interface layer or coating comprising one or more oxides of the group of metals consisting of Sn, Pb, Sb, Al, and In, and then an outer coating comprising an effective amount of the monometal or polymetal oxide having the spinel structure conforming substantially to the empirical formula $M_xZ_yCo_{3-(x+y)}O_4$, as set forth above.

Various cobalt oxide spinels coated onto electrically-conductive substrates, especially for use as anodes in brine electrolysis, are known. Of particular relevancy are U.S. Pat. Nos. 3,977,958; 4,061,549; and 4,142,005 which are herein incorporated by reference as if set forth at length.

Also of various degrees of relevancy are U.S. Pat. Nos. 4,073,873; 3,711,382; 3,711,397; 4,028,215; 4,040,939; 3,706,644; 3,528,857; 3,689,384; 3,773,555; 3,103,484; 3,775,284; 3,773,554; 3,632,498; and 3,663,280.

The spinel coating is preferably prepared by applying a fluid mixture of the metal oxide precursors to the substrate and heating under oxidizing conditions at a temperature in a range effective to form the coating in-situ on the substrate. A "polymetal" cobalt spinel is used herein to describe a spinel containing a plurality of metals, of which cobalt is one.

Cobalt oxide based anode coatings of the spinel type are sensitive to preparation temperature. Anodes prepared at temperatures above 450° C. tend to have high operating potentials in service; furthermore, these potentials tend to increase more rapidly than those of anodes prepared at lower temperatures. A high temperature yields a tougher, more highly sintered active coating, and is thus desirable, if low operating potentials can be maintained.

In general, the spinel coating is prepared in-situ on the electroconductive substrate by applying a fluid mixture (preferably a solution) of the spinel-forming precursors along with, optionally, any modifier metal oxide precursors desired, to the substrate, then heating at a temperature and for a time effective to produce the spinel structure as a layer or coating on the substrate.

The temperature effective in producing the spinel structure is generally in the range of from 200° C. to 475° C., preferably in the range of from 250° C. to 400° C. At temperatures below about 200° C. the formation of the desired spinel structure is likely to be too slow to be feasible and it is likely that substantially no spinel will be formed, even over extended periods of time. At temperatures above about 475° C. there is likely to be formed other cobalt oxide structures, such as cobaltic oxide ($Co_2O_3$) and/or cobaltous oxide (CoO), whether substituted or not. Any heating of the spinel above about 450° C. should be of short duration of not more than about 5 minutes, to avoid altering the desired spinel structures to other forms of the metal oxides and to substantially avoid oxidizing the substrate. Any modifier metal oxides present will be formed quite well at the spinel-forming temperatures.

The length of time at which the heating is done to form the spinel structure is, generally, inversely related to the temperature. At lower temperatures within the prescribed range, the time may be as much as 8 hours or more without destroying the spinel structure or converting substantial amounts of it to other oxide forms. At the upper end of the prescribed heating range, the time of heating should not be extended beyond the time needed to form the desired spinel structure because extended heating times may destroy or convert a substantial amount of the spinel to other oxide forms; at the upper end of the range a heating time in the range of from 1 to 5 minutes is generally satisfactory in forming the spinel without forming other oxide forms.

The substrates of interest in the present anode are electroconductive metals comprising the valve metals or film-forming metals which includes titanium, tantalum, zirconium, molybdenum, niobium, tungsten, hafnium, and vanadium or alloys thereof. Titanium is preferred as a substrate for preparing anodes to be used in electrolysis of brine. Other electroconductive substrates within the purview of this invention are, e.g., nickel, nickel alloys, steels, and stainless steels.

The precursor cobalt compounds used in making the present spinel structures may be any thermally-decomposable oxidizable compound which, when heated in the prescribed range, will form an oxide of cobalt. The compound may be organic, such as cobalt octoate or cobalt 2-ethyl hexanoate and the like, but is preferably an inorganic compound, such as cobalt nitrate, cobalt hydroxide, cobalt carbonate, and the like. Cobalt nitrate is especially preferred.

The precursor metal compounds of Groups IA, IB, IIA, and IIB and of the modifier metal oxides (if used) may be any thermally-decomposable oxidizable compound which, when heated in the prescribed range, will form oxides. Organic metal compounds may be used, but inorganic metal compounds are generally preferred.

Modifier metal oxides may be incorporated into the substituted $Co_3O_4$ coating to provide a tougher coating. The modifier metal oxide is selected from oxides of the metals of the following listed groups:

Group III-B (Scandium, Yttrium)
Group IV-B (Titanium, Zirconium, Hafnium)
Group V-B (Vanadium, Niobium, Tantalum)
Group VI-B (Chromium, Molybdenum, Tungsten)
Group VII-B (Manganese, Technetium, Rhenium)
Lanthanides (Lanthanum through Lutetium)
Actinides (Actinium through Uranium)
Group III-A Metals (Aluminum, Gallium, Indium, Thallium)
Group IV-A Metals (Germanium, Tin, Lead)
Group V-A Metals (Antimony, Bismuth).

The modifier metal oxide is, preferably, an oxide of cerium, bismuth, lead, vanadium, zirconium, tantalum, niobium, molybdenum, chromium, tin, aluminum, antimony, titanium, or tungsten. Mixtures of modifier metal oxides may also be used.

Most preferably, the modifier metal oxide is selected from metals of the group consisting of zirconium, vanadium, and lead, or mixtures of these, with zirconium being the most preferable of these.

The amount of modifier oxide metal or metals may be in the range of from zero to about 50 mole percent, most preferably from 5 to 20 mole percent of the total metal of the coating deposited on the electro-conductive substrate. Percentages, as expressed, represent mole percent of metal, as metal, in the total metal content of the coating. The modifier metal oxide is conveniently prepared along with the substituted $Co_3O_4$ from thermally decomposable oxidizable metal compounds, which may be inorganic metal compounds or organic metal compounds.

The carrier for the precursor metal compounds is preferably water, a mixture of water/acetone, or a mxture of water and a water-miscible alcohol, e.g., methanol, ethanol, propanol, or isopropanol. The carrier is one which readily evaporates during spinel formation. The precursor metal compounds are preferably soluble in the carrier or at least in very finely-divided form in the carrier. Solubilizing agents may be added to the mixture, such as ethers, aldehydes, ketones, tetrahydrofuran, dimethylsulfoxide, and the like. In some instances, adjustments to the pH of the mixture may be made to enhance the solubility of the metal compounds, but attention should be given to whether or not the pH adjuster (acid or base) will add any unwanted metal ions.

The procedure for preparing the coatings comprises starting with a clean substrate with surface oxides and contaminants substantially removed, at least on the surface(s) to be coated. The mixture of metal oxide precursors in a liquid carrier is applied to the substrate, such as by dipping, spraying, brushing, painting, or spreading. The so-coated substrate is subjected to a temperature in the prescribed range for a period of time to thermally oxidize the metal compounds to oxides, thereby forming the spinels of the present invention, along with any modifier metal oxides or second-phase metal oxides which may be co-prepared but which are not part of the expanded cobalt oxide spinel crystal structure. Generally, the first such application (which usually gives a relatively thin layer) is done quickly to avoid excessive oxidation of the substrate itself. Then as additional applications are made (i.e., applications of the precursor liquid carrier containing the metal compounds, followed by thermal oxidation) the thickness of the coating builds up, becomes tighter and denser, and there is a substantially reduced risk of excessively oxidizing the substrate under the spinel coating. Each subsequent layer is found to combine and unite quite readily with preceding layers and a contiguous spinel coating is formed which is adhered quite well to the substrate. It is preferred that at least 3 such layer-applications are employed, preferably from 6 to 12 such layer-applications. If the optional interface layer is omitted, the procedure is substantially the same, taken care not to overheat each application of spinel layer which could cause excessive oxidation of the substrate.

It is best to charge the initial mixture of metal compounds into the liquid carrier in such a way that the desired ratio of metals are present on a molar basis to satisfy the stoichiometry of the desired polymetal spinel, also referred to herein as expanded cobalt spinel or substituted cobalt spinel.

The folowing enumerated paragraphs are presented to offer a simplified explanation, based on belief and experience, of what transpires when one or more monovalent or divalent metal ions replace a portion of the cobalt ions in a cobalt oxide spinel, but the invention is not meant to be limited by, or confined to this simplified explanation. This explanation is intended to cover metals of Groups IA, IIA, IB, and IIB insofar as replacement of cobalt ions in a cobalt oxide spinel structure is concerned.

1. A "single-metal" cobalt oxide spinel, $Co_3O_4$, is understood as having, per molecule, one $Co^{++}$ ion and two $Co^{+++}$ ions to satisfy the valence requirements of four $O^{--}$ ions; thus the single metal cobalt spinel may be illustrated by the empirical formula $Co^{++}Co_2^{+++}O_4^{--}$ to show the stoichiometric valence balence of cobalt cations with oxygen anions.

2. When divalent metal ions are substituted into the cobalt oxide spinel structure, they tend to replace divalent cobalt ions. For example when $Mg^{++}$ is fully substituted into the $Co_3O_4$ spinel structure, it replaces $Co^{++}$ giving a spinel illustrated by the empirical formula $Mg^{++}Co_2^{+++}O_4^{--}$.

3. When monovalent metal ions are substituted into the cobalt oxide spinel structure they tend to replace divalent cobalt ions. For each monovalent metal ion introduced into the cobalt oxide spinel, an additional $Co^{++}$ is oxidized to $Co^{+++}$. The maximum monovalent metal ion substitution in such a spinel may be illustrated as, for example, $Li_{0.5}^{+}Co_{2.5}^{+++}O_4^{--}$, to show stoichiometric valence balance. The empirical formula may be illustrated as, for example, $Li_yCo_{3-y}O_4$, where y is not more than 0.5, 3−y is at least 2.5, and where (y times Li valence) plus (3−y times cobalt valence) equals 8.

4. When two divalent metal ions and one alkali metal ion are substituted into the cobalt oxide spinel structure, then the structure can be written, empirically, as e.g., $M_xM'_x, Z_yCo_{3-(x+x'+y)}O_4$.

5. When at least one monovalent metal ion and at least one divalent ion are substituted into the cobalt oxide spinel structure, then the structure can be written, empirically, as $M_xZ_yCo_{3-(x+y)}O_4$ or as, e.g., $M_xM'_x,Z_yCo_{3-(x+x'+y)}O_4$ or, e.g., as $M_xM'_x,Z_yZ'_y, Co_{3-(x+x'+y+y')}O_4$.

6. When two monovalent metal ions and two divalent ions are substituted into the cobalt oxide spinel structure, then the structure can be written, (empirically, as e.g., $M_xM'_x,Z_yZ'_y,Co_{3-(x+x'+y+y')}O_4$.

7. If an excess of monovalent and/or divalent metal ions are present in the mixture from which the substituted cobalt oxide structures are prepared, the excess metal values tend to form a separate metal oxide phase which is not a spinel structure but which is present with the spinel structure.

8. It will be understood by practitioners of these arts that there may be some degree of imperfect spinel crystals which, if they could be isolated and measured separately may not conform exactly to the empirical structures written in this disclosure, but the spinel products prepared according to this invention can be said to conform substantially to the empirical formulae given above.

9. If metal values are in the mixture (from which the spinel structures are formed) which do not effectively replace cobalt ions in the cobalt oxide spinel structure, these metals tend to form separate metal oxide phases which act as modifiers of the spinel structures. For instance, where the spinel structures are formed by building up a contiguous layer of the spinel on a substrate by repeated applications of spinel-forming ingredients, each application being followed by the heating step, the modifier metal oxides are beneficial in providing toughness and abrasion-resistance to the layer. The amount of modifier metal oxides should be limited so that the desired spinel is the predominant ingredient of the coating.

The metals of the relevant groups of the Periodic Table are as follows:

| IA | IIA | IB | IIB |
|---|---|---|---|
| Li | Be | Cu | Zn |
| Na | Mg | Ag | Cd |
| K | Ca | Au | Hg |
| Rb | Sr | | |
| Cs | Ba | | |
| Fr | Ra | | |

Of the metals in Group IA, lithium, sodium, and potassium are preferred. Lithium is most preferred. In Groups IIA, IB and IIB, magnesium, copper and zinc are preferred.

Operative upper limits for molar percentage of the M and Z metals which form polymetal spinels with cobalt are, based on total metal content of the spinel: $M \leqq 33.3$ percent, $Z \leqq 16.7$ percent and may be zero, and $M+Z \leqq 33.3$ percent. Any excess of M and Z will form a separate phase of the metal oxide amongst the spinel crystals. On a molar metal basis it is preferred that neither M nor Z be less than about 8 percent and 4 percent respectively.

Having described the invention, we claim:

1. A method for the cathodic protection of a metal embedded in concrete which is subject to galvanic corrosion by its environment, wherein the cathodic protection is provided by an impressed-current anode, using an amount of current which balances the natural requirement for electrons between the environment and the metal, and wherein the said anode comprises an electroconductive titanium metal mesh substrate having coated thereon an adhering layer of an electroconductive cobalt oxide spinel having the formula $$M_xZ_yCo_{(3-(x+y))}O_4$$

where M is a metal or a mixture of two or more metals selected from the group of metals contained in Groups IB, IIA, and IIB periodic table of the elements, where Z is a metal or mixture of two or more metals selected from the group of metals contained in Group IA, where x is equal to or greater than zero, and is less than or equal to one, and where $(x+2y)$ is greater than or equal to zero and is less than or equal to one.

2. The method of claim 1 wherein the cobalt oxide spinel coating contains at least one modifier oxide of the group consisting of the oxides of cerium, bismuth, lead, vanadium, zirconium, tantalum, niobium, molybdenum, chromium, tin, aluminum, antimony, titanium, and tungsten.

3. The method of claim 1 wherein the anode is further characterized by a metal oxide layer between at least a portion of the titanium mesh substrate and the cobalt spinel coating, said metal oxide layer consisting essentially of tin oxide, antimony oxide, lead oxide, aluminum oxide, indium oxide, or mixtures thereof.

4. The method of claim 1 wherein the structure being protected comprises metal embedded in concrete.

* * * * *